United States Patent
Bhagavathiperumal et al.

(10) Patent No.: US 9,712,650 B2
(45) Date of Patent: Jul. 18, 2017

(54) PIM FAST FAILOVER USING PIM GRAFT MESSAGE

(71) Applicant: Lenovo Enterprise Solutions (Singapore) Pte. Ltd, Singapore (SG)

(72) Inventors: Chidambaram Bhagavathiperumal, Santa Clara, CA (US); Solomon Coriiu, Bucharest (RO); Angu S. Chandra Sekaran, Santa Clara, CA (US); Ashok K. Somosundaram, Santa Clara, CA (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 502 days.

(21) Appl. No.: 14/059,245

(22) Filed: Oct. 21, 2013

(65) Prior Publication Data

US 2015/0109899 A1    Apr. 23, 2015

(51) Int. Cl.
*H04L 29/14*    (2006.01)
*H04L 12/18*    (2006.01)

(52) U.S. Cl.
CPC .......... *H04L 69/40* (2013.01); *H04L 12/1868* (2013.01)

(58) Field of Classification Search
CPC . H04L 12/185; H04L 12/437; H04L 41/0654; H04L 41/0659; H04L 41/0668; H04L 41/12
See application file for complete search history.

(56) References Cited

U.S. PATENT DOCUMENTS

| | | | |
|---|---|---|---|
| 7,719,958 B1 * | 5/2010 | Azimi | H04L 12/18 370/220 |
| 2007/0153790 A1 * | 7/2007 | Boers | H04L 12/18 370/390 |
| 2009/0245248 A1 * | 10/2009 | Arberg et al. | 370/390 |
| 2011/0019534 A1 * | 1/2011 | Ramakrishnan et al. | 370/217 |
| 2012/0263035 A1 | 10/2012 | Nakanishi et al. | |
| 2012/0327775 A1 | 12/2012 | Han et al. | |
| 2013/0242989 A1 | 9/2013 | Bhagavathiperumal et al. | |
| 2015/0109899 A1 * | 4/2015 | Bhagavathiperumal | H04L 69/40 370/218 |

OTHER PUBLICATIONS

A. Adams; Protocol Independent Multicast—Dense Mode (PIM-DM): Protocol Specification (Revised); Jan. 2005; ; ; at least §4.4.*

* cited by examiner

*Primary Examiner* — Gary Mui
*Assistant Examiner* — Stephen Steiner
(74) *Attorney, Agent, or Firm* — Jason Friday; Andrew M. Calderon; Roberts Mlotkowski Safran Cole & Calderon, P.C.

(57) ABSTRACT

A system for PIM fast failover recovery includes a network of a plurality of switching devices. The plurality of switching devices includes a source switching device near a source communicatively connected to a receiver switching device near a receiver by a first interface and at least a third switching device that is communicatively connected to the receiver switching device by a second interface and further is communicatively connected to the source switching device by a third interface. The receiver switching device may discover that the first interface has failed and responds by sending the third switching device a PIM graft message prior to deleting an associated first interface route entry.

15 Claims, 3 Drawing Sheets

PIM FAST FAILOVER USING PIM GRAFT MESSAGE

FIELD

Embodiments of invention generally relate to networking and network systems, and more particularly to Protocol Independent Multicast (PIM) fast failover using a PIM graft message.

DESCRIPTION OF THE RELATED ART

PIM is a group of multicast routing protocols for Internet Protocol (IP) networks that supports one-to-many and many-to-many data distribution over a LAN, WAN, Internet, etc. PIM does not include its own topology discovery mechanism, but instead uses routing information supplied by other traditional routing protocols such as Open Shortest Path First, Intermediate System to Intermediate System, Routing Information Protocol and Border Gateway Protocol, etc. There are four variants of PIM. A particular variant, PIM Dense Mode (PIM-DM), uses dense multicast routing and builds shortest-path trees by flooding multicast traffic domain wide, and reduces branches of the tree where no receivers are present.

One basic premise of PIM-DM is that a multicast packet flow has receivers at most locations. Therefore, PIM-DM is ideal for groups where many of the nodes will subscribe to receive multicast packets. In PIM-DM the source initially broadcasts to every node directly connected to it. The neighboring nodes further forward the data to it's neighbors. When a node does not wish to receive a particular node's or group of node's data, it sends a Prune message to indicate its lack of interest. Upon receiving a Prune message, the node will modify its state so that it will not forward those packets out to that node or group of nodes.

SUMMARY

In a first embodiment of the present invention, a system for PIM fast failover recovery includes a network comprising a plurality of switching devices. The plurality of switching devices comprising a source switching device near a source communicatively connected to a receiver switching device near a receiver by a first interface and a third switching device communicatively connected to the receiver switching device by a second interface and communicatively connected to the source switching device by a third interface. The receiver switching device may discover that the first interface has failed and responds by sending the third switching device a PIM graft message prior to deleting an associated first interface route entry.

In another embodiment of the present invention a method for PIM fast failover recovery includes determining, with a receiver switching device nearest a receiver, that a first interface that communicatively connects the receiver switching device to a source switching device nearest a source has failed; sending, with the receiver switching device, a PIM graft message to a third switching device communicatively connected to the receiver switching device by a second interface and communicatively connected to the source switching device by a third interface, and; subsequent to sending the PIM graft message, deleting an associated first interface route entry with the receiver switching device.

In yet another embodiment of the present invention, a computer program product for PIM fast failover recovery comprises a computer readable storage medium having program code embodied therewith, the program code executable to: determine, with a receiver switching device nearest a receiver, that a first interface that communicatively connects the receiver switching device to a source switching device nearest a source has failed; send, with the receiver switching device, a PIM graft message to a third switching device communicatively connected to the receiver switching device by a second interface and communicatively connected to the source switching device by a third interface, and; delete an associated first interface route entry, with the receiver switching device, subsequent to sending the PIM graft message.

These and other embodiments, features, aspects, and advantages will become better understood with reference to the following description, appended claims, and accompanying drawings.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
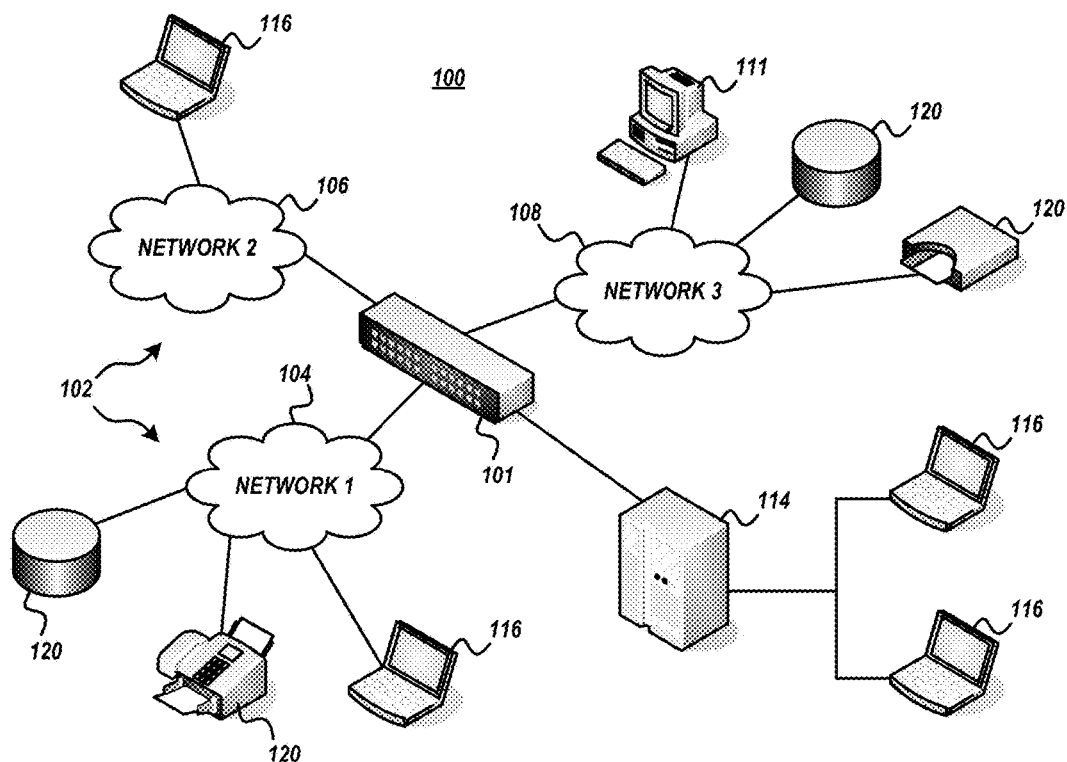
FIG. 1 depicts a network architecture, according to various embodiments of the present invention.

Details of the claimed embodiments are disclosed herein. However, it is understood that the disclosed embodiments are merely illustrative of the structures, devices, systems, methods, etc. that may be embodied in various forms. These exemplary embodiments are provided so that this disclosure will be thorough and complete and will convey the scope of this invention to those skilled in the art. In the description, details of well-known features and techniques may be omitted to avoid unnecessarily obscuring the presented embodiments.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized.

The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with various embodiments. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
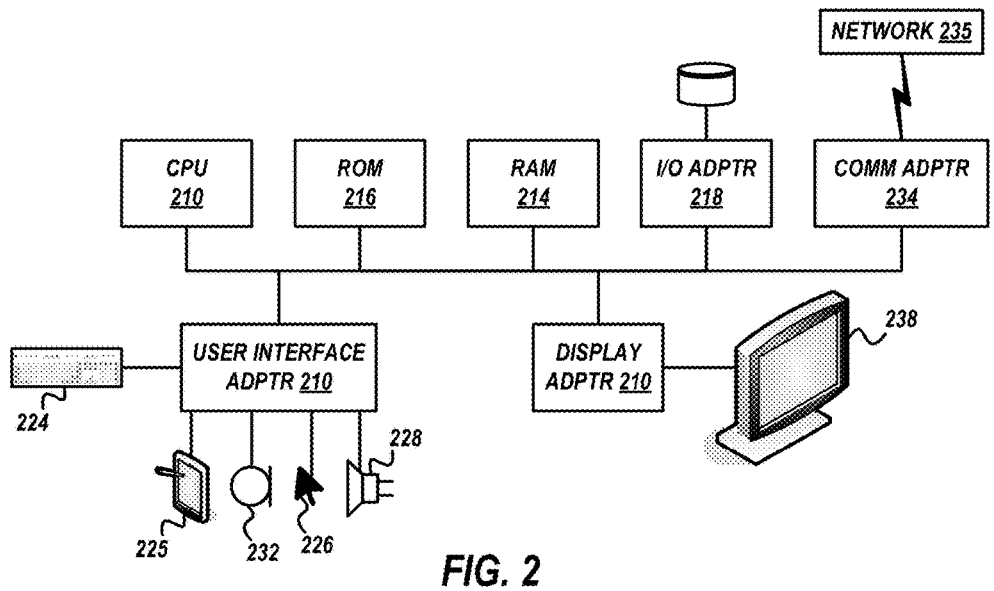
FIG. 2 depicts an exemplary data handling system associated with one or more of the network devices depicted in FIG. 1, according to various embodiments of the present invention.

FIG. 2 shows an exemplary data handling system associated with a user device 116 and/or server 114 of FIG. 1, in accordance with one embodiment. FIG. 2 illustrates a representative data handling system having a central processing unit (CPU) 210, such as a microprocessor, and a number of other units interconnected via one or more buses 212 which may be of different types, such as a local bus, a parallel bus, a serial bus, etc., according to several embodiments.

The data handling system in FIG. 2 may include a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen 225, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML; C, and/or C++ language, or other programming languages, along with an object oriented programming methodology. Object oriented programming (OOP), which has become increasingly used to develop complex applications, may be used.

Figure 3:
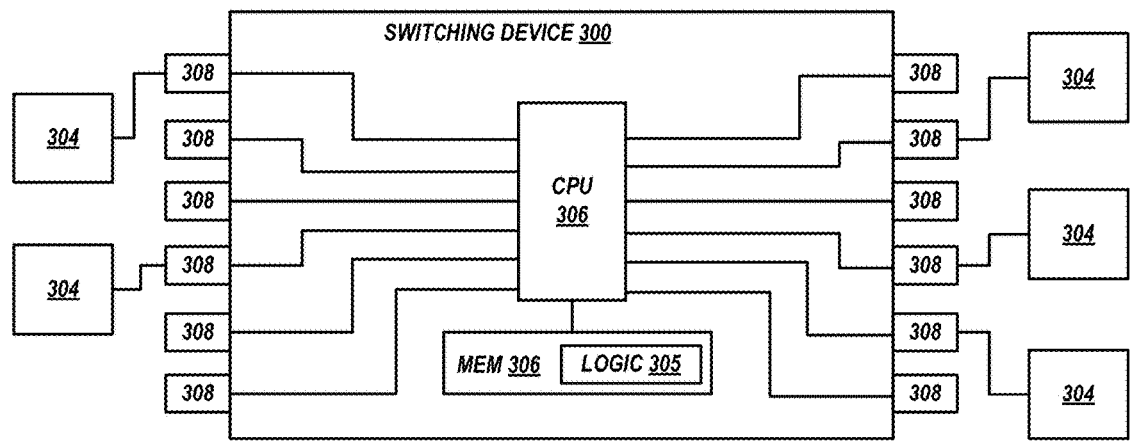
FIG. 3 depicts an exemplary switching device, according to various embodiments of the present invention.

Referring now to FIG. 3, a switching device 300 is shown according to one embodiment. As shown, the switching device 300 comprises one or more processors 306, such as a dynamic host configuration protocol (DHCP) server processor, adapted for assigning and managing device addresses for devices 304 (e.g. servers 114, user devices 116, and/or peripherals 120, etc.) electrically connected to the switching system 300, switching processor, etc. In certain embodiments, a single processor 306 is configured to carry out the functionality of switching device 300. Any type of processor known in the art may be used such as a central processing unit (CPU), a field programmable gate array (FPGA), an integrated circuit (IC), an application specific integrated circuit (ASIC), etc. The device addresses (which may also be referred to as destination addresses herein) may comprise media access control (MAC) addresses, IP addresses, and/or any other type of device address known in the art.

Processor 306 includes an arithmetic logic unit (ALU), which performs arithmetic and logical operations, and a control unit, which extracts instructions (e.g. logic 305, software, code, program, etc.) from memory 306 and decodes and executes the instructions, calling on the ALU when required. Memory 306 may be any known storage device that allows for data to be stored and accessed by processor 306. Memory 306 may be RAM (e.g. SRAM, ROM, OTP, NOR flash, etc.), SRAM, DRAM or other such equivalents used in association with processor 306.

The processor 306 includes or has access to logic 305 configured for detecting one or more multicast routers, switches, etc. connected to one or more ports coupled to the processor 306. As will be understood by one having ordinary skill in the art upon reading the present descriptions, any detection method may be utilized to determine any multicast router, switch, etc. connected to one or more ports coupled to the switching processor 306, in various approaches.

In additional embodiments, the processor 306 includes or has access to logic 305 configured for receiving at least one multicast packet. In one particular embodiment, the at least one multicast packet may be received by a packet switching ASIC of a packet switching device from a source. The processor 306 also includes or has access to logic 305 configured for forwarding at least one multicast packet to at least one destination. In one particular embodiment, the at least one multicast packet may be forwarded by the packet switching ASIC of a packet switching device. Of course, the at least one multicast packet may also be received/forwarded in any location and in any manner suitable for the presently described networking environment, as would be understood by one having ordinary skill in the art upon reading the present descriptions. In order to forward packets, processor 306 may also include or have access to logic 305 for determining the best route or path for packet routing.

In additional embodiments, the processor 306 includes or has access to logic 305 configured for sending the at least one multicast packet to the at least one destination. As will be understood by one having ordinary skill in the art upon reading the present descriptions, the at least one multicast packet may be sent in any suitable manner, such as PIM-DM, etc. as would be understood by one having ordinary skill in the art upon reading the present descriptions. Furthermore, the sending method may vary depending on the capabilities and configuration of the particular networking environment through which the packet is traversing, etc.

In still more embodiments, the processor 306 includes or has access to logic 305 configured for creating a unicast and/or multicast route entry. While much of the present description refers to Internet protocol Multicast Communications (IPMC) tables, this has been done solely to assist the reader and to place the description in a context. It should be understood that any embodiments described herein may be directed to protocols other than internet protocol (IP) and the IPMC table thus described may be, more generally, a MC table. As such, the switching processor includes or has access to logic 305 configured for creating a unicast and or multicast route entry in an IPMC table, MC table, etc. In some approaches, the IPMC table may be installed, for example, to an ASIC of the processor 306. In a preferred approach, the IPMC table is installed as a single entry in the ASIC of processor 306.

Moreover still, the processor 306 further includes or has access to logic 350 configured for installing a drop entry in the IPMC table upon determining that a route entry is disabled. The drop entry may take many forms, and includes a switching device address, group address and/or a mask. In many embodiments, the drop entry address is configured such that one or more multicast packets in an exemplary network environment are associated with a switching device, group, etc. corresponding to the drop entry address. Still further, the processor 306 includes or has access to logic 350 configured for determining whether a interface that connects neighboring switching devices 300 has a failover condition and, if affirmative, disabling the one or more route entries associated therewith.

For example, when source multicast data traffic 351 is received from a source 340 by switching device 300a, all switching devices 300 in network switching architecture 310 create a multicast route entry. More specifically, switching device 300d creates a multicast route entry with incoming interface 320ad as link towards switching device 300a, since it has the best unicast path to source 340. In accordance with various embodiments of the present invention, when the interface 320ad experiences a failover condition, switching device 300d sends a PIM graft message 350 to its neighbors (i.e. switching devices 300b, 300c) before deleting its created multicast route entry. In embodiments where there are multiple multicast route entries created by the switching devices 300, switching device 300d can bulk a group of PIM graft messages and send one single 'bulk graft' PIM message to neighboring switching device(s) 300b, 300c. This will help to avoid sending multiple messages between switching devices 300.

Figure 4:
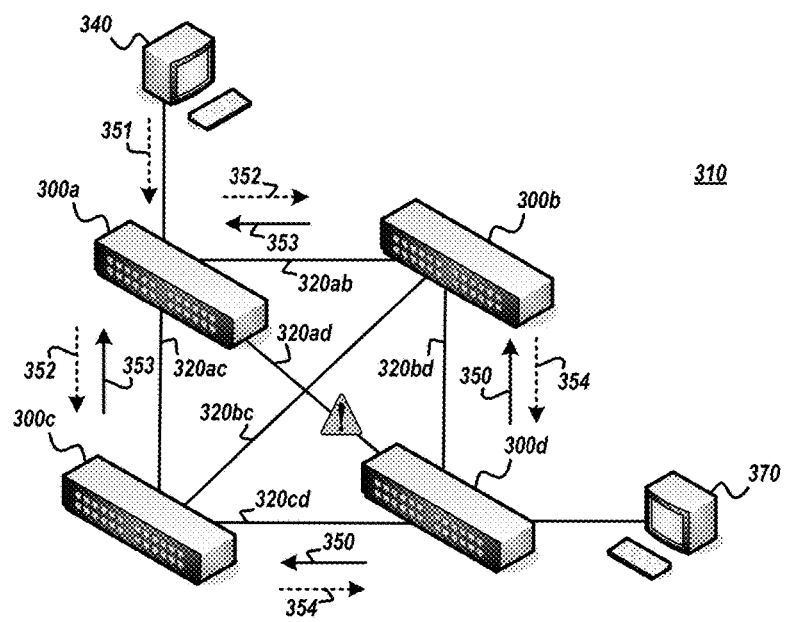
FIG. 4 depicts an exemplary network switching architecture, according to various embodiments of the present invention.

FIG. 4 depicts an exemplary network switching architecture 310, according to various embodiments of the present invention. Network switching architecture 310 includes a source 340, a plurality of switching devices 300 electrically connected to neighboring devices, and a receiver 370. The switching devices 300 provide one or more data paths for communicating data from the source 340 to the receiver 370. For example, switching device 300a is connected to switching devices 300b, 300c, 300d via interface 320ab, 320ac, 320ad, respectively. According to various embodiments of the present invention, in certain instances a particular interface (e.g. 320ad, etc.) that connects switching devices 300 may experience a failover condition (e.g. a fault, the interface is dropped, etc.) such that packets can no longer be routed along the interface route between connected switching devices 300. Therefore according to the description herein, the embodiments of the invention provide faster failover recovery and minimal packet loss in a PIM-DM topology, when a interface experiences a failover condition.

According to a known solution, when an interface experiences a failover condition, an associated router searches for the next best route and sends a graft message to source to obtain multicast traffic. If there is no best route to the source, the router will simply delete the route entry and the multicast data traffic will be received by the router only after the periodic prune process completes (a default 210 seconds) and an new unicast route to the source is implemented. The known solution is not efficient, and faster convergence is desirable.

Therefore, in order to minimize traffic loss with improved convergence, according to various embodiments of the present invention, whenever a interface on a multicast route entry experiences a failover condition, a switching device 300 deletes an associated route entry, only after sending a PIM graft message one or more neighboring switching devices 300. In other words, the switching device 300 of the embodiments of the invention no longer need wait for the periodic prune process for a new route to the source to be implemented.

For example, and referring to FIG. 4, when source multicast data traffic 351 is received from a source 340 by switching device 300a, all switching devices 300 in network switching architecture 310 create a multicast route entry. More specifically, switching device 300d creates a multicast route entry with incoming interface 320ad as link towards switching device 300a, since it has the best unicast path to source 340. In accordance with various embodiments of the present invention, when the interface 320ad experiences a failover condition, switching device 300d sends a PIM graft message 350 to its neighbors (i.e. switching devices 300b, 300c) before deleting its created multicast route entry. In embodiments where there are multiple multicast route entries created by the switching devices 300, switching device 300d can bulk a group of PIM graft messages and send one single 'bulk graft' PIM message to neighboring switching device(s) 300b, 300c. This will help to avoid sending multiple messages between switching devices 300.

When the neighboring switching device(s) 300b, 300c receives the PIM graft message 350, the neighboring switching device(s) 300b, 300c request an upstream switching device 300a to send the source multicast data traffic 351 by sending a PIM Graft message 353 to switching device 300a, respectively. Switching device 300a, in turn, sends the source multicast data traffic 351 to neighboring switching device(s) 300b, 300c via multicast data traffic 352. When multicast data traffic 352 is received, respectively, neighboring switching device(s) 300b, 300c will set their outgoing interface (i.e. 320cd, 320bd) to switching device 300d to a forwarding state and forward the received multicast data traffic 352 to switching device 300d via multicast data traffic 354.

Switching device 300d discards multicast data traffic 354 until a best route to source 340 is determined. For example, switching device 300d may determine that the route to source 340 through neighboring device 300c is the best route. When the best route to source 340 is determined, switching device 300d creates an associated multicast, unicast, etc. route entry and forwards associated traffic to receiver 370.

In certain embodiments, source 340 and receiver 370 may be e.g. a server 114, a user device 116, and/or a peripheral 120, etc.

Figure 5:
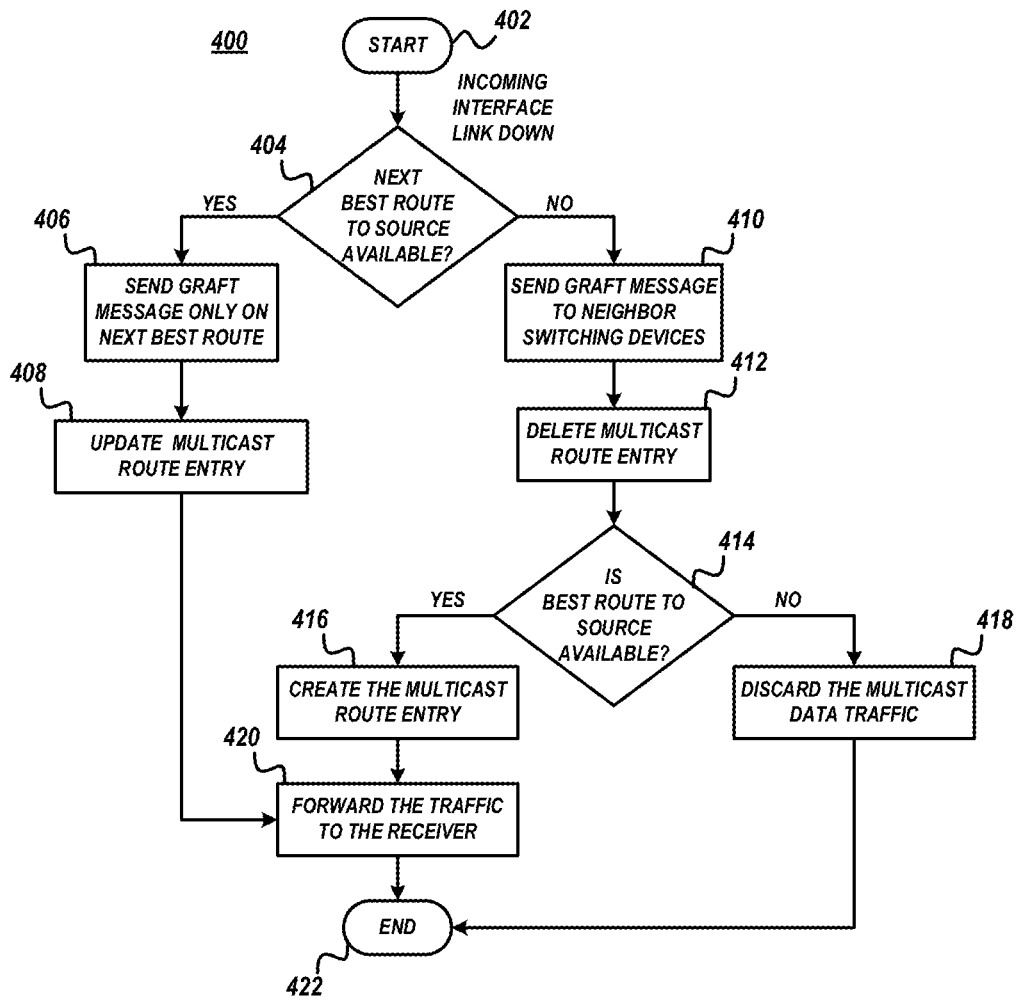
FIG. 5 depicts a flow diagram of PIM fast failover recovery process, according to various embodiments of the present invention.

FIG. 5 depicts a flow diagram of PIM fast failover recovery process 400, according to various embodiments of the present invention. Process 400 begins at block 402 when a source 340 sends source multicast data traffic 351 within a network and it is determined that an interface (e.g. 320ad, etc.) within the network has a failover condition (block 402). The switching device associated with the failover interface, e.g. switching device 300d, determines if a next best route to source 340 exists, is known, or is otherwise available (block 404). For example, switching device 300d may have previously determined that the route to source 340 through neighboring switching device 300c is a next best route.

If the next best route to source 340 exists, is known, or is otherwise available, switching device 300d sends a PIM graft message only on the next best route (block 406). Switching device 300d then updates the associated multicast route entry (block 408). For example, the switching device 300d updates a multicast route entry in its IPMC table. The source 340 multicast data traffic 351 is then routed to a receiver according to the updated multicast route entry/next best route (block 420).

If the next best route to source 340 does not exist, is not known, or is not otherwise available, switching device 300d sends a PIM graft message to neighboring switching devices (block 410). For example, switching device 300d sends a PIM graft message 350 to switching device 300b and switching device 300b. In certain embodiments where there are multiple multicast route entries created by the switching devices 300, switching device 300d can bulk a group of PIM graft messages and send one single 'bulk graft' PIM message to neighboring switching device(s) 300b, 300c. After the PIM graft message is sent to neighboring switch devices, switching device 300d deletes the multicast route entry associated with the failover interface 320ad. (block 412). For example, the switching device 300d deletes the multicast route entry in its IPMC table.

When the neighboring switching device(s) 300b, 300c receives the PIM graft message 350, the neighboring switching device(s) 300b, 300c request switching device 300a to send the source multicast data traffic 351 by sending a PIM Graft message 353 to switching device 300a, respectively. Switching device 300a, in turn, sends the source multicast data traffic 351 to neighboring switching device(s) 300b, 300c via multicast data traffic 352. When multicast data traffic 352 is received, respectively, neighboring switching device(s) 300b, 300c will set their outgoing interface (i.e. 320cd, 320bd) to switching device 300d to a forwarding state and forward the received multicast data traffic 352 to switching device 300d via multicast data traffic 354.

Switching device 300d may utilize the received multicast data traffic 352 to determine a best route to source 340. For example, switching device 300d may determine that the route to source 340 through neighboring device 300b is the best route. Until a best route to source 340 is determined by switching device 300d, it discards received multicast data traffic (block 418).

Process 400 continues with switching device 300d creating an associated multicast route entry (block 416) associated with the determined best route to source 340 (block 414). In turn, source 340 may route traffic to receiver 370 according to the route entry/determined best route (block 420). Process 400 ends at block 422.

The drawings are not necessarily to scale. The drawings are merely schematic representations, not intended to portray specific parameters of the invention. The drawings are intended to depict only exemplary embodiments of the invention. In the drawings, like numbering represents like elements.

The accompanying figures and this description depicted and described embodiments of the present invention, and features and components thereof. Those skilled in the art will appreciate that any particular nomenclature used in this description was merely for convenience, and thus the invention should not be limited by the specific process identified and/or implied by such nomenclature. Therefore, it is desired that the embodiments described herein be considered in all respects as illustrative, not restrictive, and that reference be made to the appended claims for determining the scope of the invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A system for Protocol Independent Multicast (PIM) fast failover recovery, the system comprising:
   a network comprising a plurality of switching devices, the plurality of switching devices comprising a source switching device near a source communicatively connected to a receiver switching device near a receiver by a first interface, and a third switching device communicatively connected to the receiver switching device by a second interface and communicatively connected to the source switching device by a third interface, and further comprises a fourth switching device communicatively connected to the receiver switching device by a fourth interface and communicatively connected to the source switching device by a fifth interface;
   wherein after the receiver switching device discovers the first interface has failed, the receiver switching device sends the third switching device and the fourth switching device a bulk graft PIM message comprised of a group of PIM graft messages prior to deleting an associated first interface route entry, and
   wherein after the third switching device receives the bulk graft PIM message from the receiver switching device via the second interface, the third switching device requests data traffic from the source switching device via the third interface.

2. The system of claim 1 wherein the receiver switching device discards the forwarded data traffic from the third switching device and the fourth switching device until the receiver switching device determines a best route.

3. The system of claim 2 wherein the receiver switching device routes the forwarded data traffic from either the third switching device or the fourth switching device that is associated with the best route to the receiver.

4. A method for Protocol Independent Multicast (PIM) fast failover recovery, the method comprising:
   determining, with a receiver switching device nearest a receiver, that a first interface that communicatively connects the receiver switching device to a source switching device nearest a source has failed;
   sending, with the receiver switching device, a bulk graft PIM message comprised of a group of PIM graft messages to a third switching device communicatively connected to the receiver switching device by a second interface and communicatively connected to the source switching device by a third interface, and to a fourth switching device communicatively connected to the receiver switching device by a fourth interface and communicatively connected to the source switching device by a fifth interface;
   subsequent to sending the bulk graft PIM message, deleting an associated first interface route entry with the receiver switching device;
   after the third switching device receives the bulk graft PIM message from the receiver switching device, requesting, via the third switching device and the third interface, data traffic from the source switching device; and
   after the third switching device receives the data traffic from the source switching device, setting, via the third switching device, the second interface to a forwarding state and forwarding the data traffic to the receiver switching device via the second interface.

5. The method of claim 4 further comprising:
discarding, with the receiver switching device, the forwarded data traffic from the third switching device and the fourth switching device.

6. The method of claim 5, further comprising:
determining, with the receiver switching device, a best route chosen from a first route from the receiver switching device to the source switching device via the third switching device or from a second route from the receiver switching device to the source switching device via the fourth switching device.

7. The method of claim 6, further comprising:
routing to the receiver, with the receiver switching device, the forwarded data traffic from either the third switching device or the fourth switching device that is associated with the best route.

8. A computer program product for Protocol Independent Multicast (PIM) fast failover recovery, the computer program product comprising a hardware computer readable storage device having program code embodied therewith, the program code executable to:
determine, with a receiver switching device nearest a receiver, that a first interface that communicatively connects the receiver switching device to a source switching device nearest a source has failed;
send, with the receiver switching device, a bulk graft PIM message to a third switching device communicatively connected to the receiver switching device by a second interface and communicatively connected to the source switching device by a third interface, and to a fourth switching device communicatively connected to the receiver switching device by a fourth interface and communicatively connected to the source switching device by a fifth interface;
delete an associated first interface route entry, with the receiver switching device, subsequent to sending the bulk graft PIM message;
request data traffic from the source switching device, via the third switching device and the third interface, after the third switching device receives the bulk graft PIM message from the receiver switching device via the second interface; and
request data traffic from the source switching device, via the fourth switching device and the fifth interface, after the fourth switching device receives the bulk graft PIM message from the receiver switching device via the fourth interface.

9. The computer program product of claim 8 wherein the program code is further executable to:
receive, with the third switching device, the bulk graft PIM message from the receiver switching device, and;
request, with the third switching device, data traffic from the source switching device.

10. The system of claim 1, wherein the first interface connects the source switching device and the receiver switching device without requiring a connection through either the third or fourth switching devices.

11. The system of claim 1, wherein after the fourth switching device receives the bulk graft PIM message from the receiver switching device, the fourth switching device requests data traffic from the source switching device.

12. The system of claim 11, wherein after the third switching device receives the data traffic from the source switching device, the third switching device sets the second interface to a forwarding state and forwards the data traffic to the receiver switching device via the second interface.

13. The system of claim 12, and after the fourth switching device receives the data traffic from the source switching device, the fourth switching device sets the fourth interface to a forwarding state and forwards the data traffic received from the source switching device to the receiver switching device via the fourth interface.

14. The method of claim 4, wherein, after the fourth switching device receives the bulk graft PIM message from the receiver switching device, requesting, via the fourth switching device, data traffic from the source switching device, and, after the fourth switching device receives the data traffic from the source switching device, setting, via the fourth switching device, the fourth interface to a forwarding state and forwarding the data traffic received from the source switching device to the receiver switching device via the fourth interface.

15. The computer program product of claim 8 wherein the program code is further executable to:
set the second interface to a forwarding state and forward the data traffic to the receiver switching device via the second interface when the third switching device receives the data traffic from the source switching device; and
set the fourth interface to a forwarding state and forward the data traffic received from the source switching device to the receiver switching device via the fourth interface when the fourth switching device receives the data traffic from the source switching device.

* * * * *